United States Patent [19]

Yamada

[11] Patent Number: 5,431,050
[45] Date of Patent: Jul. 11, 1995

[54] SEMICONDUCTOR SENSOR WITH NESTED WEIGHT PORTIONS FOR CONVERTING PHYSICAL QUANTITY INTO TWISTING STRAINS

[75] Inventor: Keizo Yamada, Tokyo, Japan

[73] Assignee: NEC Corporation, Tokyo, Japan

[21] Appl. No.: 168,386

[22] Filed: Dec. 17, 1993

[30] Foreign Application Priority Data

Dec. 25, 1992 [JP] Japan .................................. 4-345743

[51] Int. Cl.6 ............................................. G01P 15/08
[52] U.S. Cl. ................................................. 73/517 R
[58] Field of Search ................... 73/517 R, 517 B, 505

[56] References Cited

U.S. PATENT DOCUMENTS

| | | | |
|---|---|---|---|
| 4,598,585 | 7/1986 | Boxenhorn | 73/505 |
| 5,016,072 | 5/1991 | Greiff | 73/504 |
| 5,081,867 | 1/1992 | Yamada | 73/517 R |
| 5,195,371 | 3/1993 | Greiff | 73/505 |

FOREIGN PATENT DOCUMENTS

| | | |
|---|---|---|
| 0323709 | 7/1989 | European Pat. Off. . |
| 0424149 | 4/1991 | European Pat. Off. . |
| 4-169856 | 6/1992 | Japan . |
| 4-278464 | 10/1992 | Japan . |
| 2186085 | 8/1987 | United Kingdom . |

Primary Examiner—Hezron E. Williams
Assistant Examiner—Helen C. Kwok
Attorney, Agent, or Firm—Young & Thompson

[57] ABSTRACT

An semiconductor acceleration sensor has an inner weight member supported by a supporting member through a pair of first torsion bars for converting a component force into displacement thereof and an outer weight member supported by the inner weight member through a pair of second torsion bars for converting another component force into displacement thereof, and the displacements are respectively converted into variations of capacitances of two pairs of capacitors, wherein one of the two pairs of capacitors is disposed at first areas where loops of a bidirectional rotation of the inner weight member and nodes of a bidirectional rotation of the outer weight member take place, and the other of the two pairs of capacitors is positioned at second areas where loops of the bidirectional rotation of the outer weight member and nodes of the bidirectional rotation of the inner weight member take place, thereby preventing the two pairs of capacitors from interference.

7 Claims, 17 Drawing Sheets

SEMICONDUCTOR SENSOR WITH NESTED WEIGHT PORTIONS FOR CONVERTING PHYSICAL QUANTITY INTO TWISTING STRAINS

FIELD OF THE INVENTION

This invention relates to a semiconductor sensor and, more particularly, to a capacitor type semiconductor sensor for measuring a physical quantity such as, for example, an acceleration convertible into variation of the capacitance.

DESCRIPTION OF THE RELATED ART

Various semiconductor sensors have been proposed for measuring a physical quantity, and each of the semiconductor sensors decomposes an objective physical quantity into two or three components for independently measuring them.

A typical example of the semiconductor sensor in the first category is disclosed in Japanese Publication of Unexamined Publication No. 4-278464, and is illustrated in FIGS. 1 and 2. The prior art semiconductor sensor is fabricated on a silicon substrate 1 with a square major surface, and comprises an oxide film covering the major surface of the silicon substrate 1, four lower electrodes 2a, 2b, 2c and 2d disposed in four corner areas of the major surface, a contact electrode 2e disposed in a central area of the major surface, an oxide film 3 covering the electrodes 2a to 2e for isolation and a movable upper electrode 4 spaced apart from the lower electrodes 2a to 2d and electrically coupled with the contact electrode 2e.

The movable upper electrode 4 has a trunk portion 4a upwardly projecting from the contact electrode 2e, four beam portions 4b, 4c, 4d and 4e horizontally projecting from the trunk portion 4a and spaced apart at 90 degrees and a peripheral frame portion 4f supported by the four beam portions 4b to 4e. The peripheral frame portion 4f are confronted with the four lower electrodes 2a to 2d, and the electrodes 2a to 2e are connected through wirings 5a to 5e with pads 6a to 6e, respectively.

The prior art semiconductor sensor thus arranged is firstly calibrated before measuring acceleration. If the prior art semiconductor sensor is accelerated under the calibrated conditions, the movable electrode 4f is declined under the acceleration, and becomes farther from and/or closer to the lower electrodes 2a to 2d. The servo-voltages on the lower electrodes 2a to 2d are measured, and three orthogonal components are calculated on the servo-voltages. If Va, Vb, Vc and Vd are respectively indicative of the servo-voltages at the lower electrodes 2a to 2d, the vertical component of the acceleration is represented as (Va+Vb+Vc+Vd), and the horizontal two components are expressed as (Va+Vb−Vc−Vd) and (Va+Vc−Vb−Vd), respectively.

The prior art semiconductor sensor thus arranged converts a force into bending deformation of the beams 4b to 4e by means of the peripheral frame portion 4f. The magnitude of bending deformation is proportional to the length of the beam, and the magnitude of bending moment is proportional to the mass of the peripheral frame portion 4f. In order to increase the mass of the frame portion 4f without increase of the dimensions of the upper electrode 4, the beams 4b to 4e become short. On the other hand, the if the beams 4b to 4e are increased in length, the peripheral frame portion 4f becomes narrow, and the mass is decreased. Thus, there is a trade-off between the mass of the peripheral weight portion 4f and the length of the beams 4b to 4e, and the sensitivity to the external force is not acceptable.

Another semiconductor sensor is disclosed in Japanese Publication of Unexamined Application No. 4-169856, and achieves a balance of the sensitivity to the vertical component with the other sensitivities. FIG. 3 and 4 illustrates the second semiconductor sensor, and is formed in a generally square semiconductor substrate 11.

The semiconductor substrate 11 is partially etched away for forming two pairs of moats 12 and 13. The pair of moats 12 spaces a peripheral thick portion 14 from an intermediate thick portion 15, and allows a pair of thin beam portions 16 to connect the peripheral thick portion 14 with the intermediate thick portion 15. Similarly, the pair of moats 13 spaces the intermediate thick portion 15 from a central thick portion 17, and allows a pair of thin beam portions 18 to connect the intermediate thick portion 15 with the central thick portion 17. Strain gauge groups 16a, 16b, 18a and 18b are respectively formed in the thin beam portions 16 and 18, and each strain gauge group forms parts of a bridge circuit (not shown).

Assuming now that a force F1 due to acceleration of a rigid body 19 fixed to the thick peripheral portion 14 is exerted to the center of gravity G in direction X parallel to line B—B as shown in FIG. 5A, the central thick portion 17 and the intermediate thick portion 15 downwardly pulls the left thin beam portion 16 in direction of X1, and upwardly pulls the right thin beam portion 16 in direction X2 due to the distance D between the neutral line of the thin beam portions 16 and the center of gravity G. As a result, the tensile strain takes place on the peripheral side of the left thin beam portion 16 and on the central side of the right thin beam portion 16. On the other hand, the compressive strain takes place on the central side of the left thin beam portion 16 and on the peripheral side the right thin beam portion 16 as shown in FIG. 5B. The strain gauge groups 16a and 16b are accordingly deformed, and the associated bridge circuits detects the deformation.

When the rigid body 19 is accelerated in a direction Y perpendicular to the direction X, the central thick portion 17 deforms the other pair of thin beam portions 18 as similar to the pair of thin beam portions 16, and the associated strain gauge groups 18a and 18b detects the deformation.

On the other hand, if a vertical force F2 is exerted on the second semiconductor sensor as shown in FIG. 6A, the total weight of the central and intermediate thick portions 17 and 15 produces a bending moment exerted on the thin beam portions 16, and, accordingly, the compressive strains on the central side and the tensile strains on the peripheral side (see FIG. 6B). The vertical force F2 further produces a bending moment exerted on the thin beam portions 18, and causes the central thick portion 17 to deform the thin beam portions 18 as shown in FIG. 7A. As a result, the tensile strain and the compressive strain takes place in the pair of thin beam portions 18 (see FIG. 7B). The tensile and compressive strains are detected by the strain gauge groups 16a, 16b, 18a and 18b.

Thus, the prior art semiconductor acceleration sensor detects and measures the magnitude of an acceleration through decomposition of the acceleration into the three orthogonal directions. The central and peripheral thick portions 17 and 15 effectively deform the thin beam portions 16 and 18, and the second prior art semiconductor sensor is well sensitive to the vertical force.

However, the distance D is indispensable for producing the tensile and compressive strains in the presence of a horizontal force, and a first problem is encountered in the second prior art semiconductor sensor in that the thin beam portions 16 and 18 are liable to be broken due to insufficient mechanical strength.

Another problem is difficulty in formation of the thin portions 16. In order to form the thin beam portions 16, it is necessary to partially etch the thick portions from the reverse surfaces thereof, and such a partial etching is presently impossible.

Yet another problem inherent in the second prior art semiconductor sensor is a vertical component produced from a horizontal force. In detail, as described in conjunction with the horizontal force F1, the thin beam portions 16 are obliquely pulled by the central thick portion 17 and/or the intermediate thick portion 15, and the associated strain gauge groups can not discriminate the vertical component of the horizontal force F1 from a vertical force. For a vertical force, a similar phenomenon takes place. This means that the second prior art semiconductor sensor can not exactly decompose a force into orthogonal components, and the output signals from the associated bridge circuits do not exactly reflect the magnitudes of horizontal components.

The present inventor proposed other prior art semiconductor sensors disclosed in Japanese Publication of Unexamined Application Nos. 63-248066 and 63-273660.

SUMMARY OF THE INVENTION

It is therefore an important object of the present invention to provide a semiconductor sensor which exactly decompose a force exerted thereon into components without sacrifice of the sensitivities thereto.

To accomplish the object, the present invention proposes to convert components of a force into twisting strains.

In accordance with one aspect of the present invention, there is provided a semiconductor sensor, comprising: a) a substrate having a major surface; b) a conductive supporting member projecting from a central area of the major surface of the substrate; c) a conductive inner weight member provided over the major surface, and bidirectionally rotatable around a first center axis when an external force is exerted thereon; d) a pair of first conductive torsion bars coupled between the conductive supporting member and the conductive inner weight member, and having a second center axis substantially aligned with the first center axis; e) a conductive outer weight member provided over the major surface, and bidirectionally rotatable around a third center axis when the external force is exerted thereon; f) a pair of second conductive torsion bars coupled between the conductive inner weight member and the conductive outer weight member, and having a fourth center axis substantially aligned with the third center axis; g) a pair of first electrodes forming parts of a first capacitor means together with the conductive inner weight portion, and positioned at first areas in the major surface where loops of a bidirectional rotation of the conductive inner weight member and nodes of a bidirectional rotation of the conductive outer weight member take place; and h) a pair of second electrodes forming parts of a second capacitor means together with the conductive outer weight portion, and positioned at second areas in the major surface where loops of the bidirectional rotation of the conductive outer weight member and nodes of the bidirectional rotation of the conductive inner weight member take place.

In accordance with another aspect of the present invention, there is provided a semiconductor sensor comprising: a) a substrate having a major surface; b) a supporting member projecting from a central area of the major surface of the substrate; c) an inner weight member provided over the major surface, and bidirectionally rotatable around a first center axis when an external force is exerted thereon; d) a pair of first torsion bars of a semiconductor substance coupled between the supporting member and the inner weight member, and having a second center axis substantially aligned with the first center axis; e) an outer weight member provided over the major surface, and bidirectionally rotatable around a third center axis when the external force is exerted thereon; f) a pair of second torsion bars of the semiconductor substance coupled between the inner weight member and the outer weight member, and having a fourth center axis substantially aligned with the third center axis; g) a pair of first piezoresistance means formed in the pair of first torsion bars for converting first twisting strains into a first electric signal, and positioned at first areas where loops of a bidirectional rotation of the inner weight member and nodes of a bidirectional rotation of the outer weight member take place; and h) a pair of second piezoelectric means formed in the pair of second torsion bars for converting second twisting strains into a second electric signal, and positioned at second areas where loops of the bidirectional rotation of the outer weight member and nodes of the bidirectional rotation of the inner weight member take place.

The supporting member, the inner weight member, the pair of first torsion bars, the outer weight member and the pair of second torsion bars may be integral with one another.

BRIEF DESCRIPTION OF THE DRAWINGS

The features and advantages of the semiconductor sensor according to the present invention will be more clearly understood from the following description taken in conjunction with the accompanying drawings in which.

DESCRIPTION OF THE PREFERRED EMBODIMENTS

First Embodiment

Figure 1:
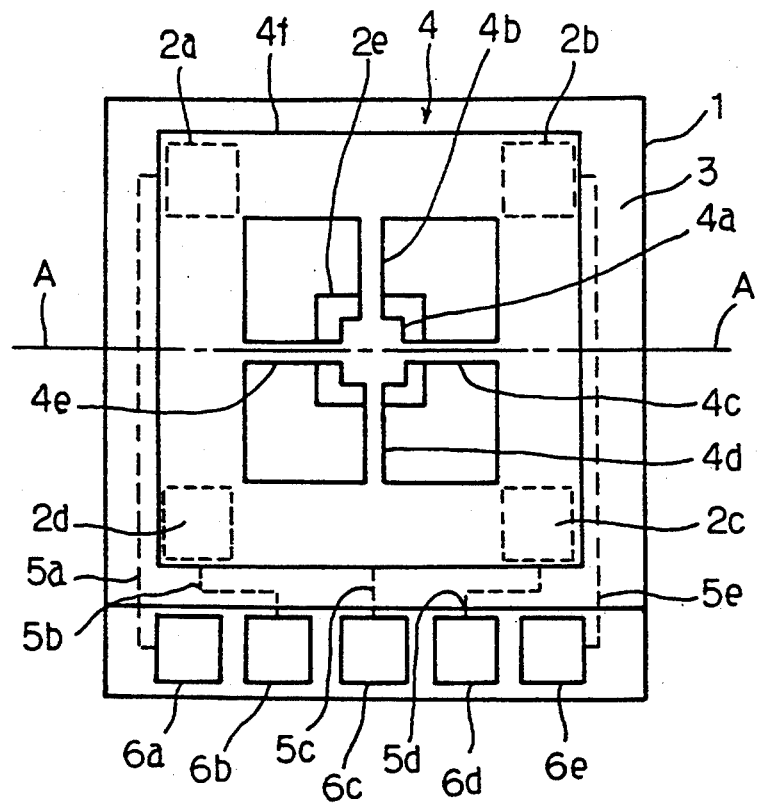
FIG. 1 is a plan view showing the arrangement of the first prior art semiconductor sensor.
Figure 2:
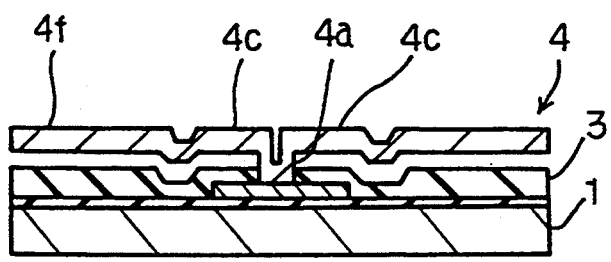
FIG. 2 is a cross sectional view taken along line A—A and showing the structure of the first prior art semiconductor sensor.
Figure 3:
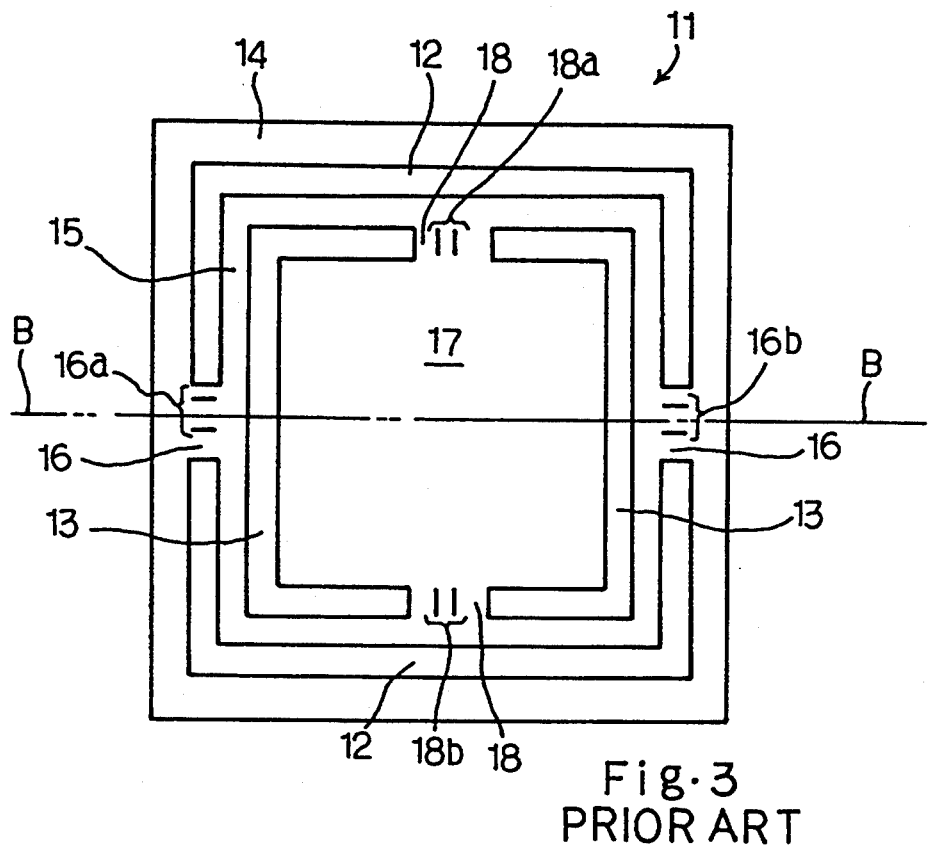
FIG. 3 is a plan view showing the arrangement of the second prior art semiconductor sensor.
Figure 4:
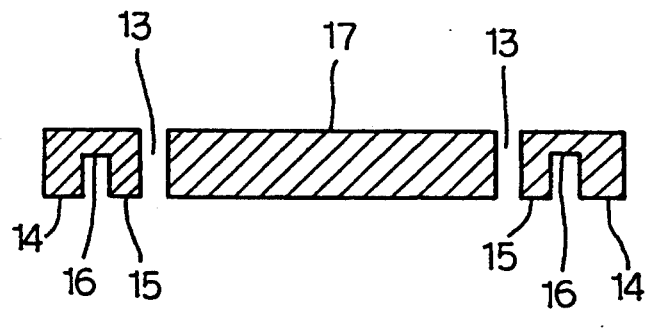
FIG. 4 is a cross sectional view taken along line B—B of FIG. 3 and showing the structure of the second prior art semiconductor sensor.
Figure 5A:
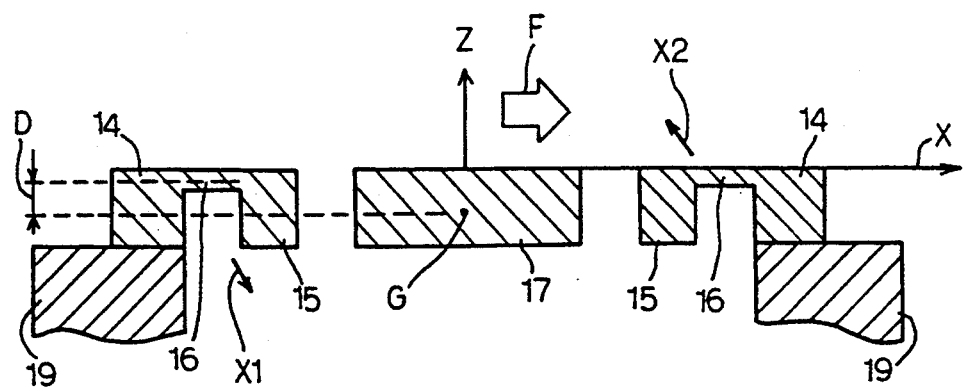
FIG. 5A is a cross sectional view showing the deformation due to the horizontal force exerted on the second semiconductor sensor.
Figure 5B:
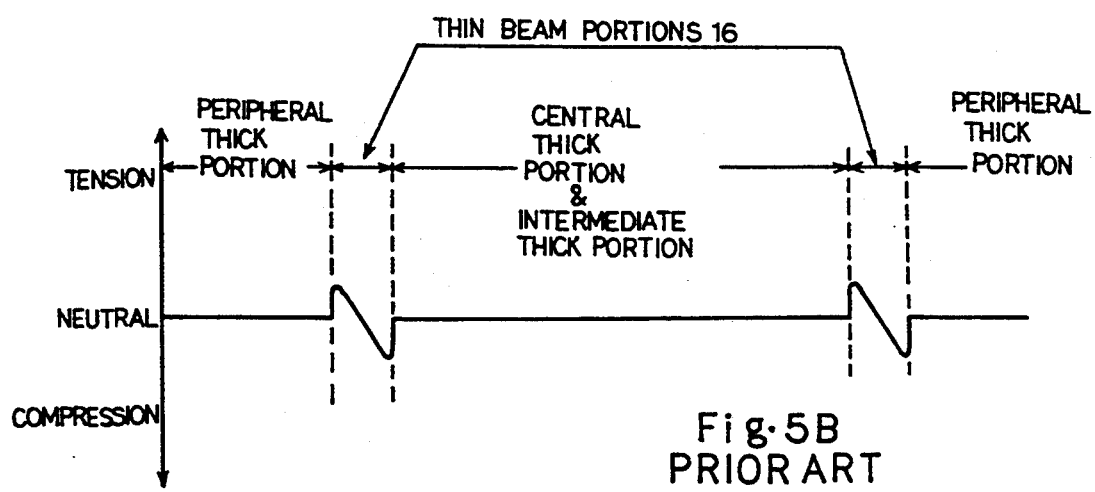
FIG. 5B is a graph showing the deformation of the thin beam portion due to the horizontal force.
Figure 6A:
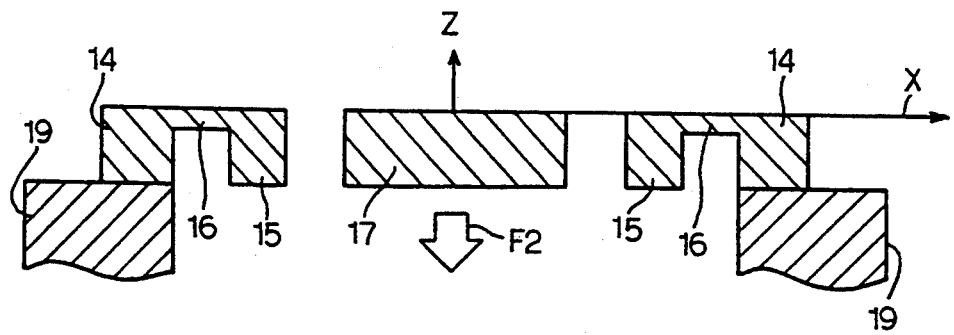
FIG. 6A is a cross sectional view showing the deformation of one of the two pairs of thin beam portions due to the vertical force.
Figure 6B:
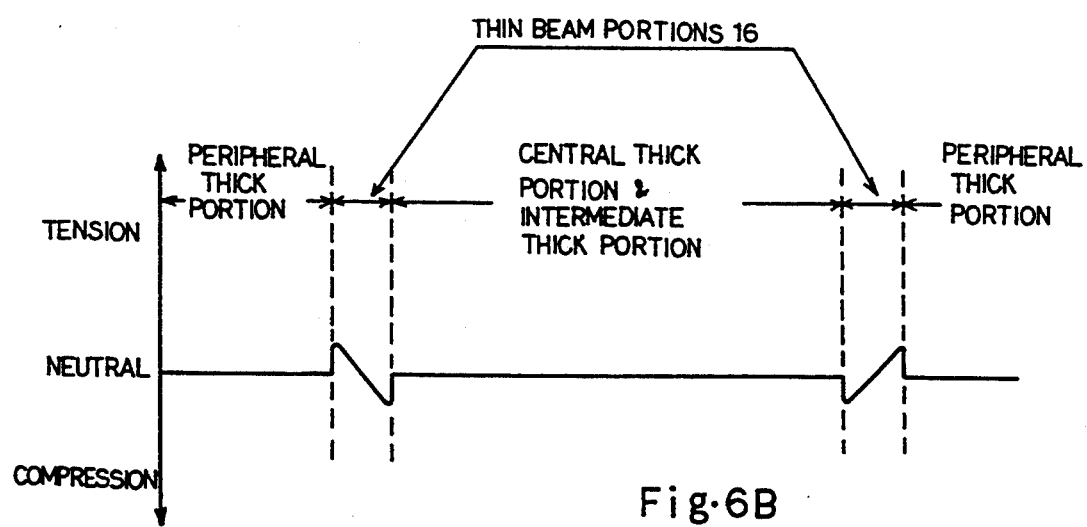
FIG. 6B is a graph showing the deformation of the thin beam portions due to the vertical force.
Figure 7A:
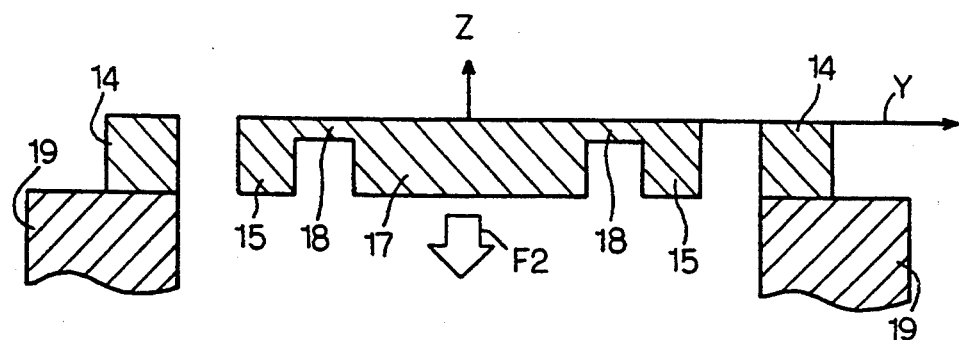
FIG. 7A is a cross sectional view showing the deformation of the other pair of thin beam portions due to the vertical force.
Figure 7B:
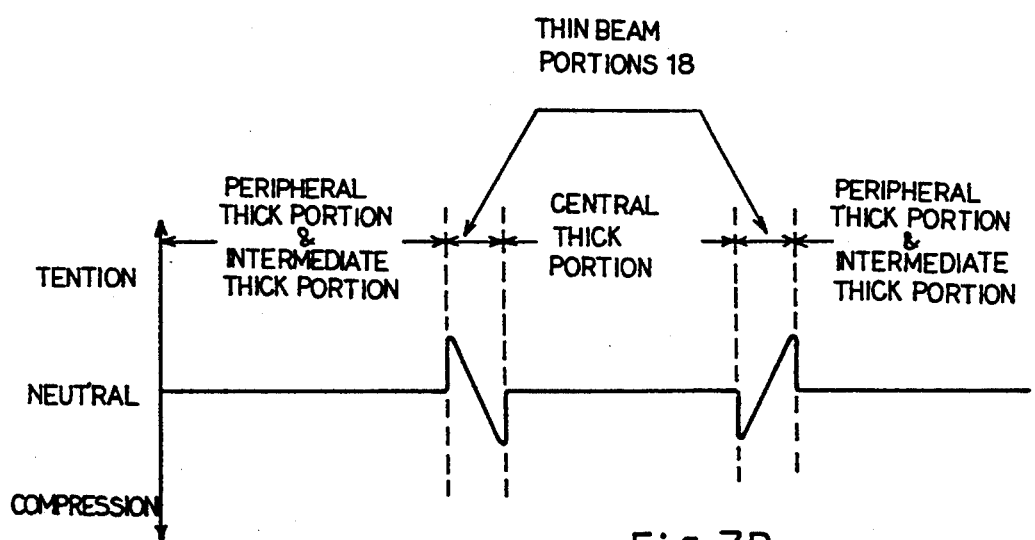
FIG. 7B is a graph showing the deformation of the thin beam portions due to the vertical force.
Figure 8:
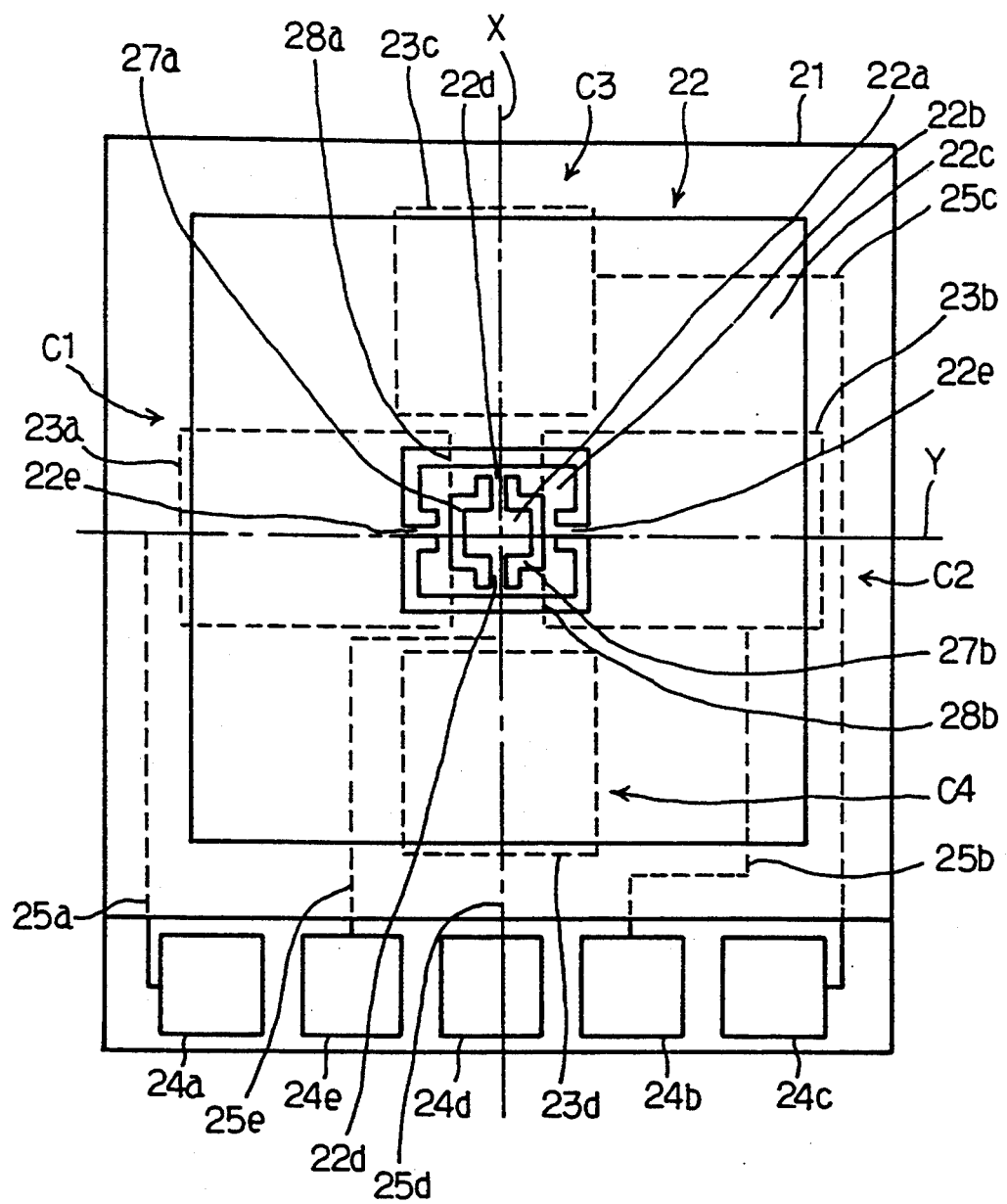
FIG. 8 is a plan view showing the arrangement of a semiconductor sensor according to the present invention.
Figure 9:
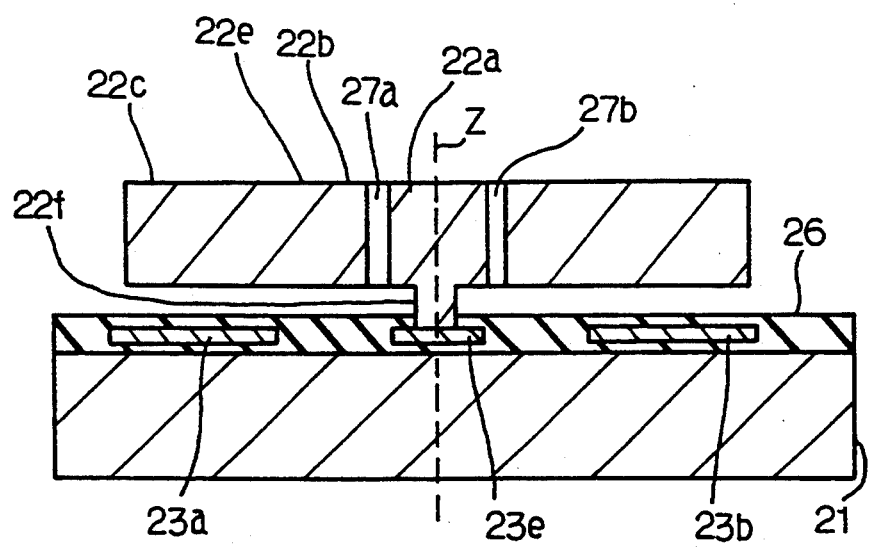
FIG. 9 is a cross sectional view showing the structure of the semiconductor sensor shown in FIG. 8.

Referring to FIGS. 8 and 9 of the drawings, a semiconductor acceleration sensor embodying the present invention largely comprises a semiconductor substrate 21, a movable structure 22, an array of electrodes 23a, 23b, 23c, 23d and 23e patterned on the major surface of the semiconductor substrate 21, an array of pads 24a, 24b, 24c, 24d and 24e also patterned on the major surface, 24d and 24e, wirings 25a, 25b, 25c, 25d and 25e connected between the electrodes 23a to 23e and the pads 24a to 24e, respectively and a insulating passivation film 26 covering the electrodes 23a to 23e. Orthogonal three axes X, Y and Z are assumed as shown.

The movable structure 22 is formed of semiconductor material, and two pairs of elongated apertures 27a/27b and 28a/28b are formed in the movable structure 22. The two pairs of elongated apertures 27a/27b and 28a/28b define a central supporting portion 22a, an inner weight portion 22b, an outer weight portion 22c, a pair of first torsion bars 22d and a pair of second torsion bars 22e. The central supporting portion 22a, the inner weight portion 22b, the outer weight portion 22c, the first torsion bars 22d and the second torsion bars 22e are equal in thickness, and the mechanical strength of the first and second torsion bars 22d and 22e is large enough in the direction of Z-axis to support the inner weight portion 22b and the outer weight portion 22c for long service time of the semiconductor acceleration sensor.

In detail, the elongated apertures 27a and 27b are symmetrical with respect to the axis X, and are widely spaced apart from each other for defining the central supporting portion 22a therebetween. On the other hand, both ends of the elongated aperture 27a are slightly spaced from both ends of the elongated aperture 27b, and form the pair of first torsion bars 22d.

The inner weight portion 22b and the pair of first torsion bars 22d respectively have a first center rotational axis and a second center axis substantially aligned with the axis X, and the inner weight portion 22b is bidirectionally rotatable around the first center axis when an external force is exerted on the inner weight portion 22b. Although the pair of first torsion bars 22d are twisted in the bidirectional rotation of the inner weight portion 22b, the pair of first torsion bars 22d is not broken, because the pair of first torsion bars 22d is sufficiently strong to withstand the twisting motion.

Similarly, the elongated apertures 28a and 28b are symmetrical with respect to the axis Y, and are also widely spaced apart form each other for defining the inner weight portion 22b therebetween. Both ends of the elongated aperture 28a are also slightly spaced apart from both ends of the elongated aperture 28b, and form the pair of second torsion bars 22e.

The outer weight portion 22c and the pair of second torsion bars 22e respectively have a third center rotational axis and a fourth center axis substantially aligned with the axis Y, and the outer weight portion 22c is bidirectionally rotatable around the third center axis when an external force is exerted on the outer weight portion 22c. The pair of second torsion bars 22d are similarly twisted in the bidirectional rotation of the outer weight portion 22c; however, the pair of second torsion bars 22e is not broken because of large mechanical strength thereof.

The first and second torsion bars 22d and 22e electrically conducts the central supporting portion 22a to the outer weight portion 22c, and allows the inner weight portion 22b and the outer weight portion 22c to further serve as a counter electrode shared between two capacitors C1 and C2 and a counter electrode shared between two capacitors C3 and C4. In this instance, the capacitors C1 and C2 as a whole constituted a first capacitor means, and the capacitors C3 and C4 form in combination a second capacitor means.

The central supporting portion 22a is merged with a trunk portion 22f, and is held in contact with the electrode 23e. For this reason, a bias voltage is supplied from the pad 24e through the wiring 25e, the electrode 23e, the trunk portion 22f, the central supporting portion 22a, and the first torsion bars 22d to the inner weight portion 22b and further through the second torsion bars 22e to the outer weight portion 22c. In this instance, the central supporting portion 22a and the trunk portion 22f as a whole constitute a conductive supporting member.

The other electrodes 23a/23b and 23c/23d are confronted with the inner weight portion 22b and the outer weight portion 22c, and serve as lower electrodes of the capacitors C1 to C4, respectively.

In this instance, the electrodes 23a and 23b are symmetrical with respect to the axis X, and the inner weight portion 22b turns around the axis X over the leading end portions of the electrodes 23a and 23b. In general, if a position of a member is farther from a center of angular motion, the displacement of the position is wider. The electrodes 23a and 23b are disposed under the periphery of the inner weight portion 22b, and the periphery of the inner weight portion 22b is widely moved with respect to the electrodes 23a and 23b. In other words, the electrodes 23a and 23b are disposed at loops of a vibratory motion of the inner weight portion 22b, and, for this reason, the capacitors C1 and C2 widely change their capacitances depending upon the angular position of the inner weight portion 22b.

Similarly, the electrodes 23c and 23d are symmetrical with respect to the axis Y, and the outer weight portion 22c turns around the axis Y over the electrodes 23c and 23d. The electrodes 23c and 23d are disposed at loops of a vibratory motion of the outer weight portion 22c, and, for this reason, the capacitors C3 and C4 widely change their capacitances depending upon the angular position of the outer weight portion 22c.

However, the electrodes 23c and 23d are disposed at nodes of the vibratory motion of the inner weight portion 22b, and are less affectable by the vibratory motion of the inner weight portion 22b. Similarly the electrodes 23a and 23b are disposed at nodes of the vibratory motion of the outer weight portion 22c, and are less affectable by the vibratory motion of the outer weight portion 22c.

In general, a vibration is composed by overlapping normal vibrations each called a mode of vibration, and the mode of vibration is controllable by applying a force thereto. The influence of the force is given by the inner product between the form of the mode and the force. For this reason, the influence or the efficiency of the force is maximized at a loop, and is minimized at a node. As described hereinbefore, the electrodes 23a and 23b are disposed at the loops of the vibratory motion of the inner weight portion 22b as well as at the nodes of the vibratory motion of the outer weight portion 22c, and, on the contrary, the electrodes 23c and 23d are disposed at the loops of the vibratory motion of the outer weight portion 22c as well as at the nodes of the vibratory motion of the inner weight portion 22b. As a result, the inner weight portion 22b does not have any influence on the outer weight portion 22c, and the outer weight portion 22c does not interfere the vibratory motion of the inner weight portion 22b.

When an external force is exerted on the semiconductor acceleration sensor, the external force is decomposed into component forces, and two component forces allow the inner and outer weight portions 22b and 22c to turn around the axes X and Y, respectively. The displacement of the inner weight portion 22b is converted into variations in the capacitances of the capacitors C1 and C2, and the displacement of the outer weight portion 22c is converted into variations in the capacitances of the capacitors C3 and C4. Since the inner weight portion 22b and the outer weight portion 22c do not interfere with each other, the two pairs of variations of the capacitances are respectively indicative of the magnitudes of the two components forces, and the magnitude of the external force is calculated from the magnitudes of the component forces.

If the semiconductor acceleration sensor is coupled with the electric circuit disclosed in Japanese Unexamined Publication No. 4-278464, the component forces are estimated by using the servo-voltages at the electrodes 23a to 23d as described in the background of the invention.

Description is hereinbelow made of a process sequence according to the present invention with reference to FIGS. 10A to 10H. The process sequence starts with preparation of a silicon substrate 31, and a silicon oxide film 32 is deposited over the entire surface of the silicon substrate 31. An aluminum film is further deposited on the silicon oxide film 32, and is, then, patterned into electrodes, wirings and pads as similar to those shown in FIG. 8. However, FIG. 10A only shows three electrodes 33a to 33c corresponding to the electrodes 23a, 23e and 23b. Silicon oxide is deposited over the entire surface, and a smooth top surface is created for a silicon oxide film 34.

Figure 10A:
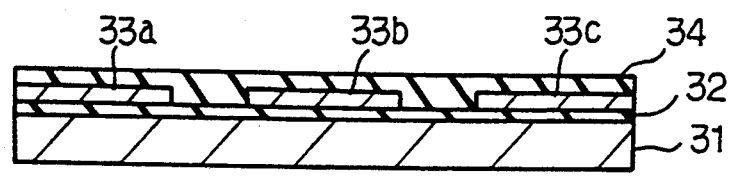
FIGS. 10A to 10H are cross sectional views showing a process sequence of fabricating the semiconductor sensor according to the present invention.
Figure 10B:
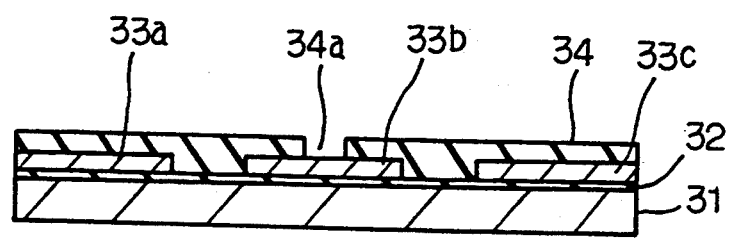

A contact hole 34a is formed in the silicon oxide film 34 through a lithographic process, and exposes a part of the electrode 33b as shown in FIG. 10B.

Figure 10C:
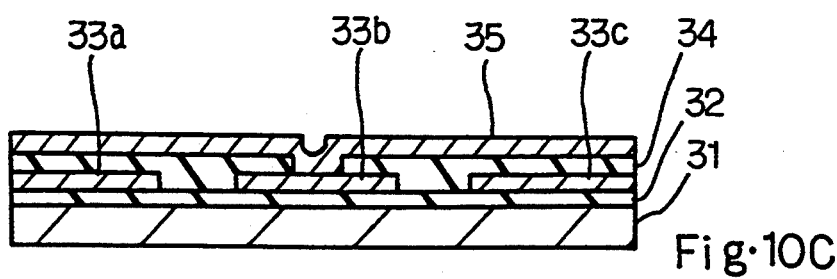
Figure 10D:
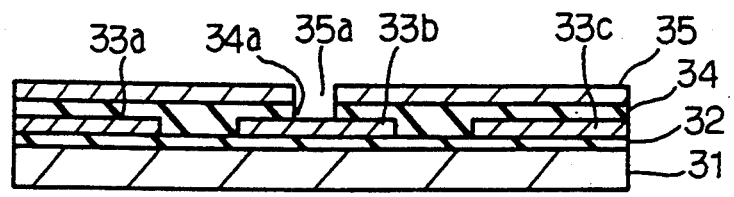

A gold film 35 is deposited over the entire surface of the structure as shown in FIG. 10C, and a contact hole 35a is formed in the gold film 35 in such a manner as to be overlapped with the contact hole 34a as shown in FIG. 10D.

Figure 10E:
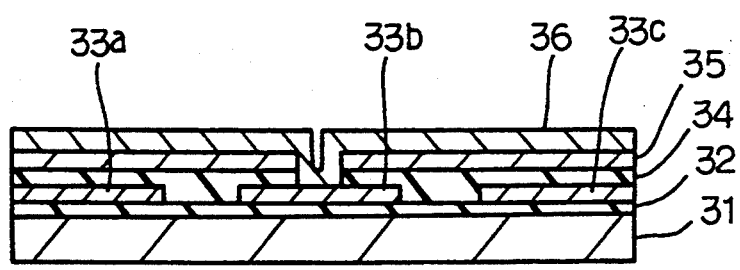

A conductive film 36 such as, for example, a titanium film is deposited over the gold film 35 as shown in FIG. 10E, and the conductive substance fills the contact holes 34a and 35a. As a result, the conductive film 36 is held in contact with the electrode 33b.

Figure 10F:
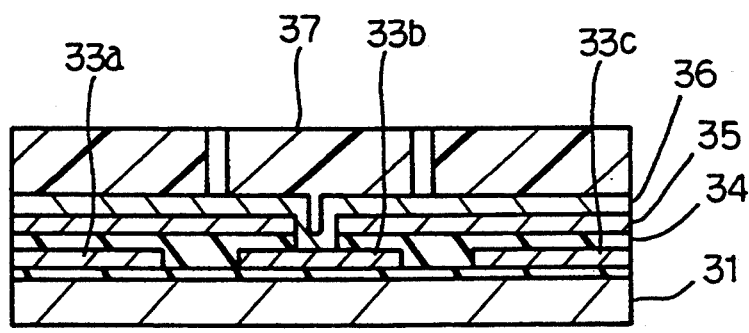

A mask 37 is patterned on the conductive film 36, and covers the conductive film 36 except for areas assigned to two pairs of elongated apertures as shown in FIG. 10F.

Figure 10G:
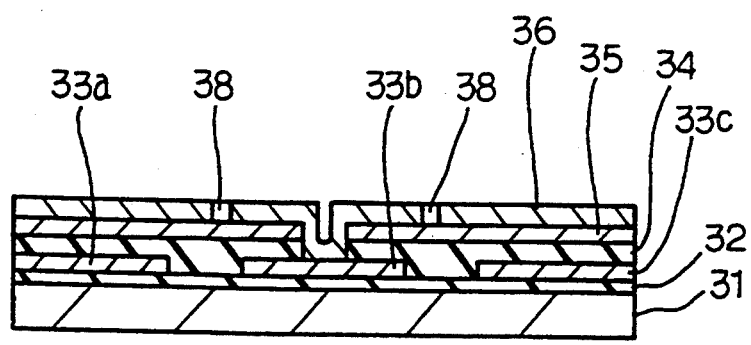

Using the mask 37, the conductive film 36 is partially etched away, and two pairs of elongated apertures are formed in the conductive film 36. FIG. 10G shows only one pair of elongated apertures 38 corresponding to the elongated apertures 27a and 27b.

Figure 10H:
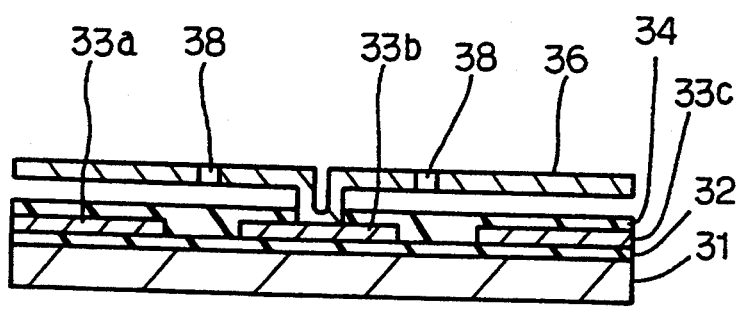

Finally, the gold film 35 is etched away, and the conductive film 36 is spaced apart from the silicon oxide film 34 as shown in FIG. 10H.

As will be appreciated from the foregoing description, the semiconductor acceleration sensor according to the present invention is fabricated on the silicon substrate 31 through deposition and lithographic processes, and all of the films keep the original thicknesses. In other words, none of the films are partially decreased in thickness, and no difficult step is incorporated in the process sequence.

Moreover, the twisting deformations are increased by decreasing the widths of the torsion bars, and the semiconductor acceleration sensors are improved in sensitivity without sacrificing the device dimensions.

Second Embodiment

Figure 11:
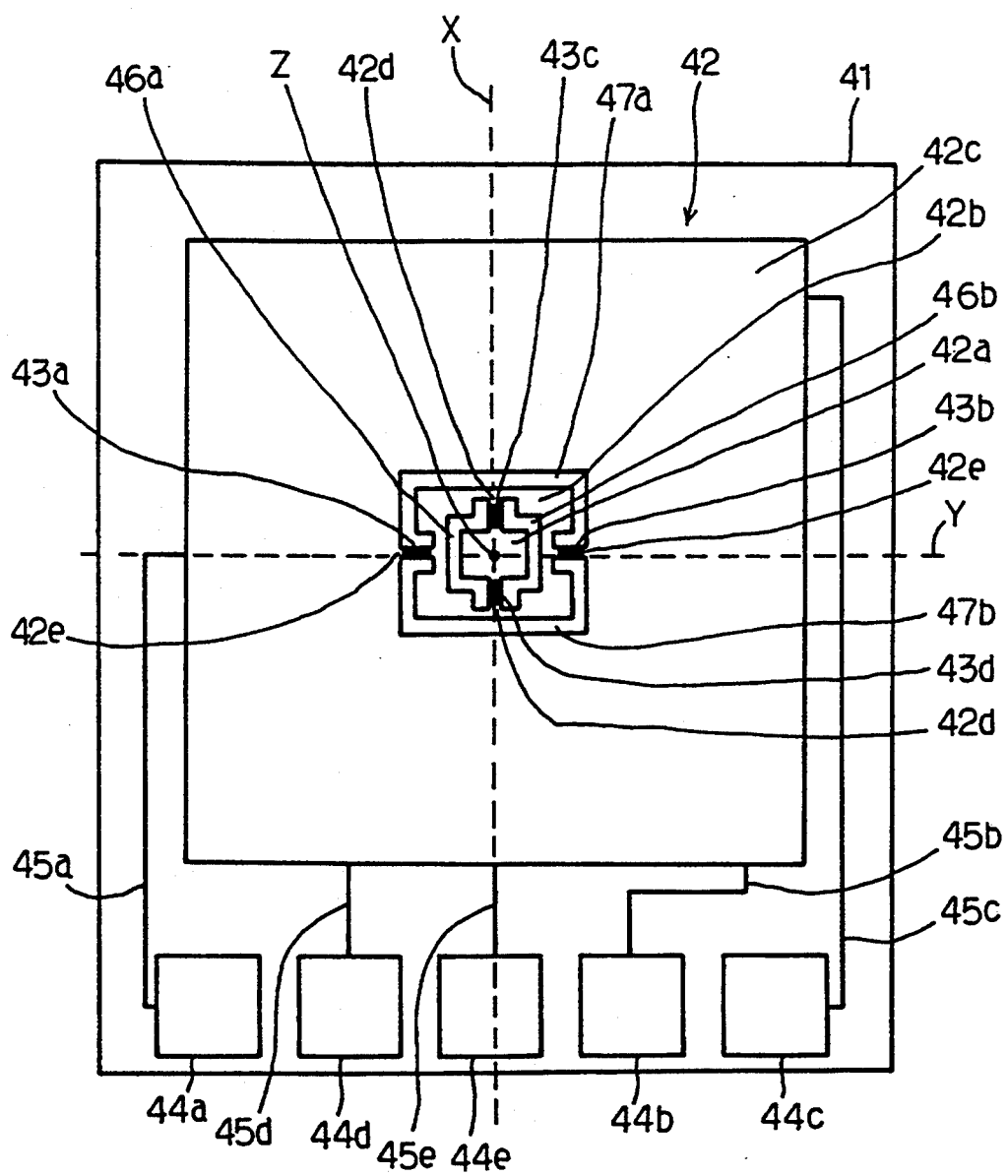
FIG. 11 is a plan view showing the arrangement of another semiconductor sensor according to the present invention.

Turning to FIG. 11 of the drawings, another semiconductor acceleration sensor comprises a substrate 41, a movable structure 42, four piezo-resistance elements 43a, 43b, 43c and 43d formed in the movable structure 42, array of pads 44a, 44b, 44c, 44d and 44e patterned on the major surface of the substrate 41 and wirings 45a, 45b, 45c, 45d and 45e connected between the piezo-resistance elements 43a to 43d and the pads 44a to 44e, respectively. Small black boxes are indicative of the piezo-resistance elements 43a to 43d. Electric current is supplied from the pad 44e to the piezo-resistance elements 43a to 43d, and four branch-currents flow out from the other pads 44a to 44d. Orthogonal three axes X, Y and Z are assumed as shown.

Two pairs of elongated apertures 46a/46b and 47a/47b are formed in the movable structure 42. The two pairs of elongated apertures 46a/46b and 47a/47b define a central supporting portion 42a, an inner weight portion 42b, an outer weight portion 42c, a pair of first torsion bars 42d and a pair of second torsion bars 42e. The central supporting portion 42a, the inner weight portion 42b, the outer weight portion 42c, the first torsion bars 42d and the second torsion bars 42e are equal in thickness, and the mechanical strength of the first and second torsion bars 42d and 42e is large enough to support the inner weight portion 42b and the outer weight portion 42c for long service time of the semiconductor acceleration sensor.

Figure 12:
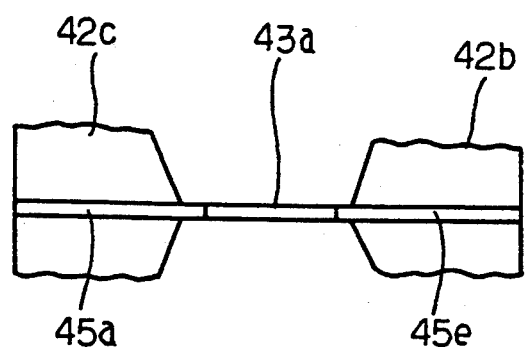
FIG. 12 is a plan view showing, in an enlarged scale, a torsion bar incorporated in the semiconductor sensor shown in FIG. 11.
Figure 13:
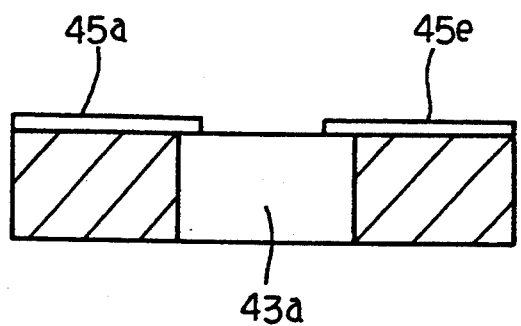
FIG. 13 is a cross sectional view showing the structure of the torsion bar.

As shown in FIGS. 12 and 13, each of the piezo-resistance elements such as 43a is as narrow as the torsion bar 42e, and the associated wirings 45e and 45a are held in contact on both sides of the piezo-resistance element 43a.

The relation between the central supporting portion 42a, the inner weight portion 42b and the outer weight portion 42c is similar to those of the first embodiment. Namely, the inner weight portion 42b is turnable around the axis X, and the outer weight portion 42c is turnable around the axis Y.

When the inner and outer weight portions 42b and 42c turn around the axes X and Y, respectively, twisting strains take place in the torsion bars 42d and 42e, and change the resistances of the piezo-resistance elements 43a to 43d. The twisting strains are indicative of the magnitude of the component forces exerted on the inner and outer weight portions 42b and 42c, and are converted into variations of resistances.

In a modification, piezo-resistance elements are formed on both sides of each torsion bar, and form parts of a Wheatstone bridge circuit. Moreover, another modification may have piezo-resistance elements each formed in a central area of an associated torsion bar.

Third Embodiment

Figure 14:
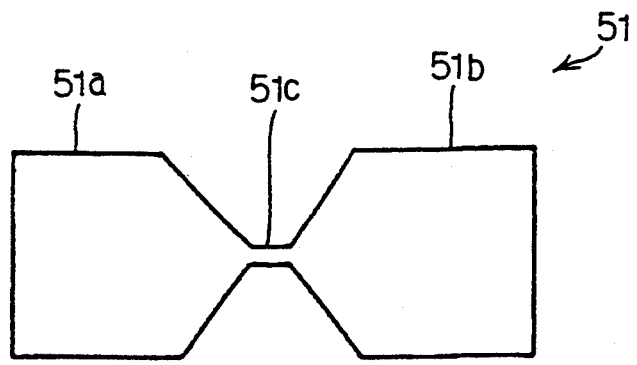
FIG. 14 is a plan view showing a torsion bar incorporated in yet another semiconductor sensor according to the present invention.

FIG. 14 illustrates a torsion bar 51 incorporated in yet another semiconductor sensor embodying the present invention, and two pairs of torsion bars 51 are connected between a central supporting portion and an inner weight portion and between the inner weight portion and an outer weight portion. The central supporting portion, the inner weight portion, the outer weight portion and the two pairs of torsion bars 51 form parts of a movable structure similar to that of the first or second embodiment, and are supported over a substrate.

The torsion bar 51 has wide end portions 51a and 51b merged into the central supporting portion/ the inner weight portion or into the inner weight portion/the outer weight portion and a narrow intermediate portion 51c merged into the wide end portions 51a and 51b. However, the torsion bar 51 has uniform thickness.

Figure 15:
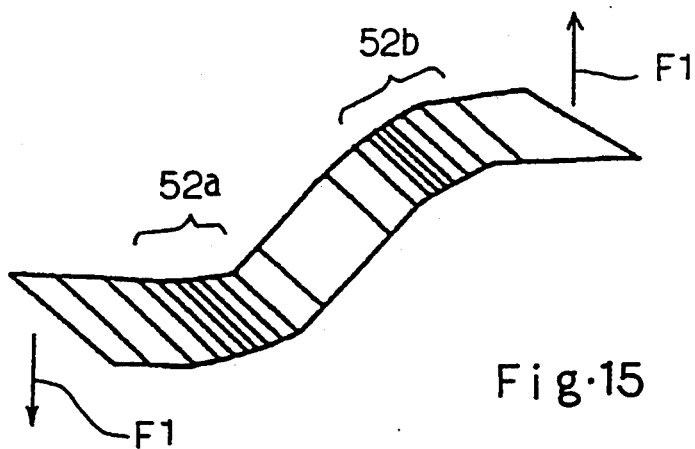
FIG. 15 is a topographical view showing magnitudes of stress produced in an ideal torsion bar when a sharing force is exerted thereon in the direction of Z-axis.
Figure 16:
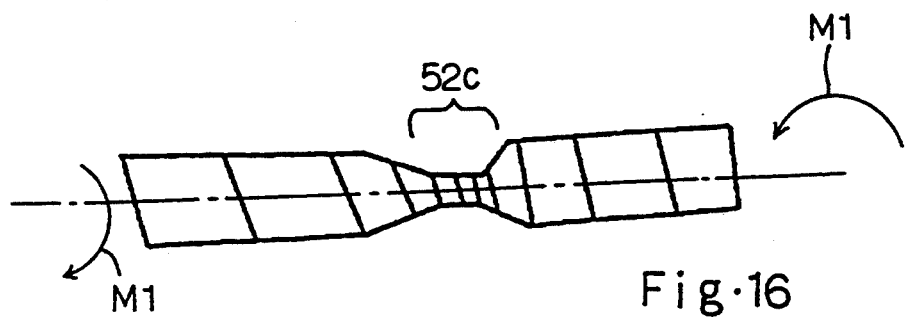
FIG. 16 is a topographical view showing magnitudes of twisting stress produced in the ideal torsion bar when a torsional moment is exerted thereon.

As described hereinbefore, if a shearing force F1 is exerted on an ideal torsion bar, the stress is concentrated in both end portions 52a and 52b of the ideal torsion bar as shown in FIG. 15. On the other hand, if a torsional moment M1 is exerted on the ideal torsion bar, the concentration of stress takes place in the intermediate portion as shown in FIG. 16.

The torsion bars incorporated in the semiconductor sensor according to the present invention are expected to not only produce large twist angle but also rigidly support the inner or outer weight member. The wide end portions 51a and 51b well withstand against the shearing force due to the inner or outer weight portion, and the narrow intermediate portion 51c allows the torsion bar 51 to turn over large twist angle.

Fourth Embodiment

Figure 17:
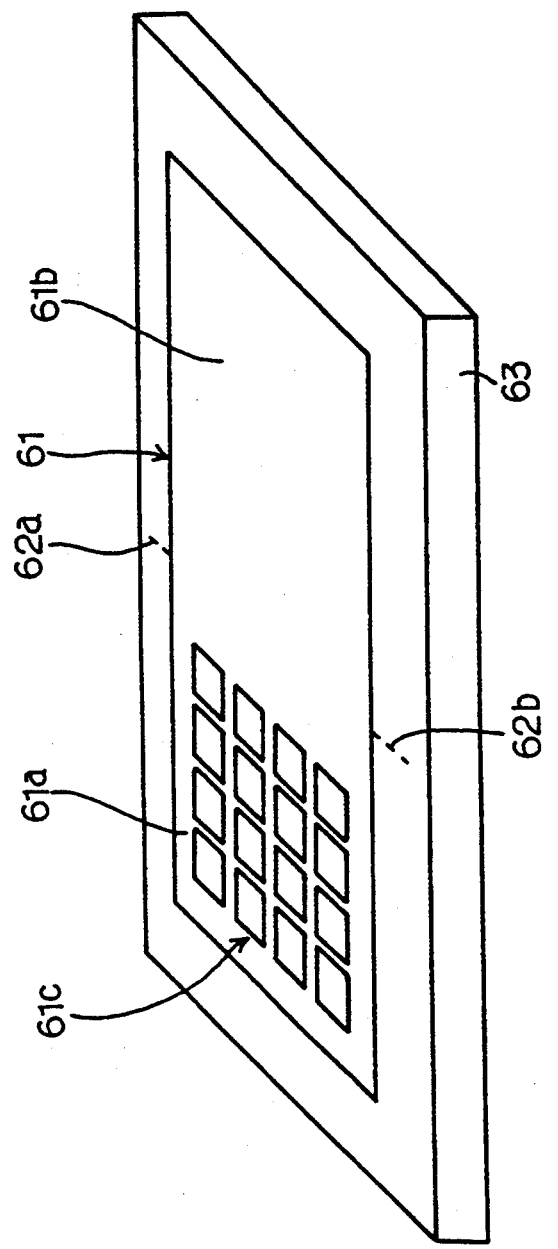
FIG. 17 is a perspective view showing a concept of a weight portion according to the present invention.

FIG. 17 illustrates a concept of a weight member 61 embodying the present invention, and the weight member 61 is supported through a pair of torsion bars 62a and 62b by a frame member 63.

The weight member 61 has a left side portion 61a and a right side portion with respect to the pair of torsion bars 62a and 62b, and an array of apertures 61c is formed in the left side portion 61a only. The apertures 61c are open at both top and back surfaces of the weight member 61.

The array of apertures 61c causes the center of gravity to deviate from a rotational axis of the weight member 61 aligned with the center axes of the torsion bars 62a and 62b, and the weight member 61 is asymmetrical with respect to the rotational axis.

The array of apertures 61c is better than an additional weight attached to either side portion, because the asymmetry takes place with respect to the rotational axis only.

The asymmetric weight changes a sensitivity to a particular component force, and is available for a semiconductor sensor according to the present invention.

Figure 18:
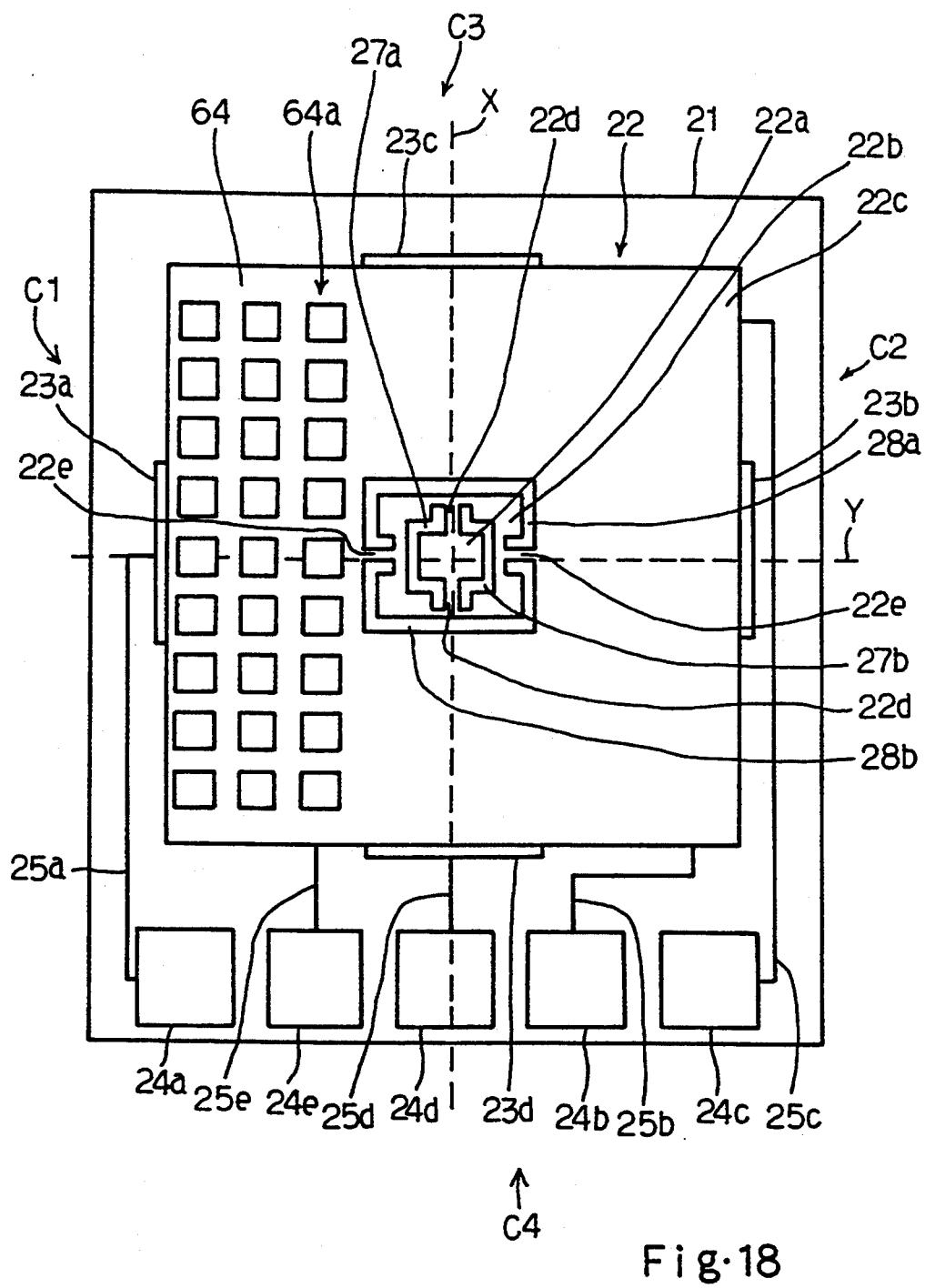
FIG. 18 is a plan view showing the arrangement of still another semiconductor sensor according to the present invention to which the concept of the weight shown in FIG. 17 is appertains.

FIG. 18 illustrates a semiconductor acceleration sensor embodying the present invention, and the concept of asymmetric weight is applied to an outer weight portion 64. An array of square apertures 64a is formed in the outer weight portion 64. However, the other components are similar to those of the first embodiment, and no further description on the structure is incorporated hereinbelow. The array of square apertures 64a makes the weight asymmetric with respect to the X-axis, and the outer weight portion 64 modifies the sensitivity to a component force in the direction of Y-axis.

Figure 19:
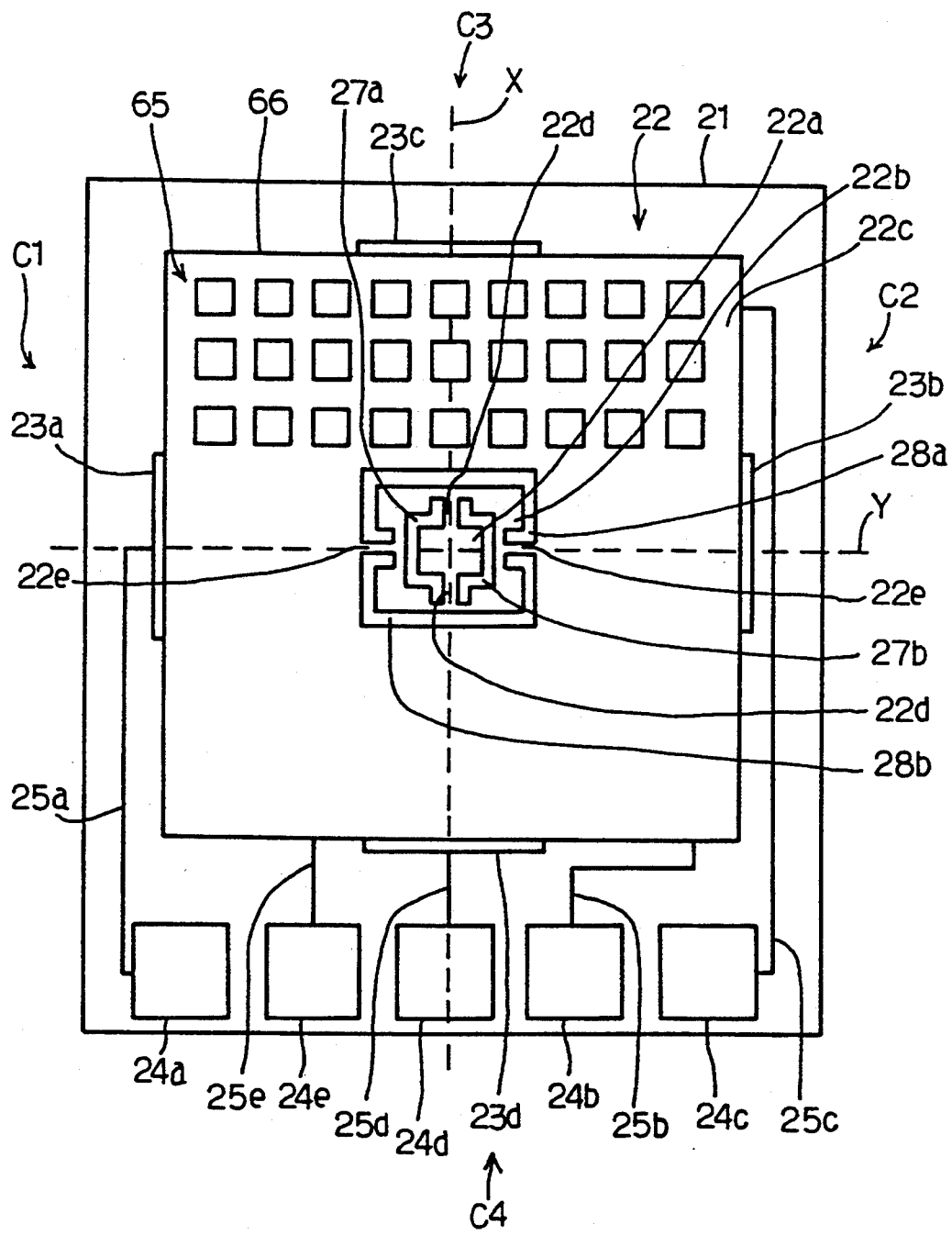
FIG. 19 is a plan view showing the arrangement of a first modification of the still another semiconductor sensor.

FIG. 19 illustrates a modification of the semiconductor sensor implementing the fourth embodiment, and an array of square apertures 65 is formed in an outer weight portion 66. Therefore, the outer weight portion 66 is asymmetric with respect to the axis Y, and modifies the sensitivity to a component force in the direction of X-axis.

Figure 20:
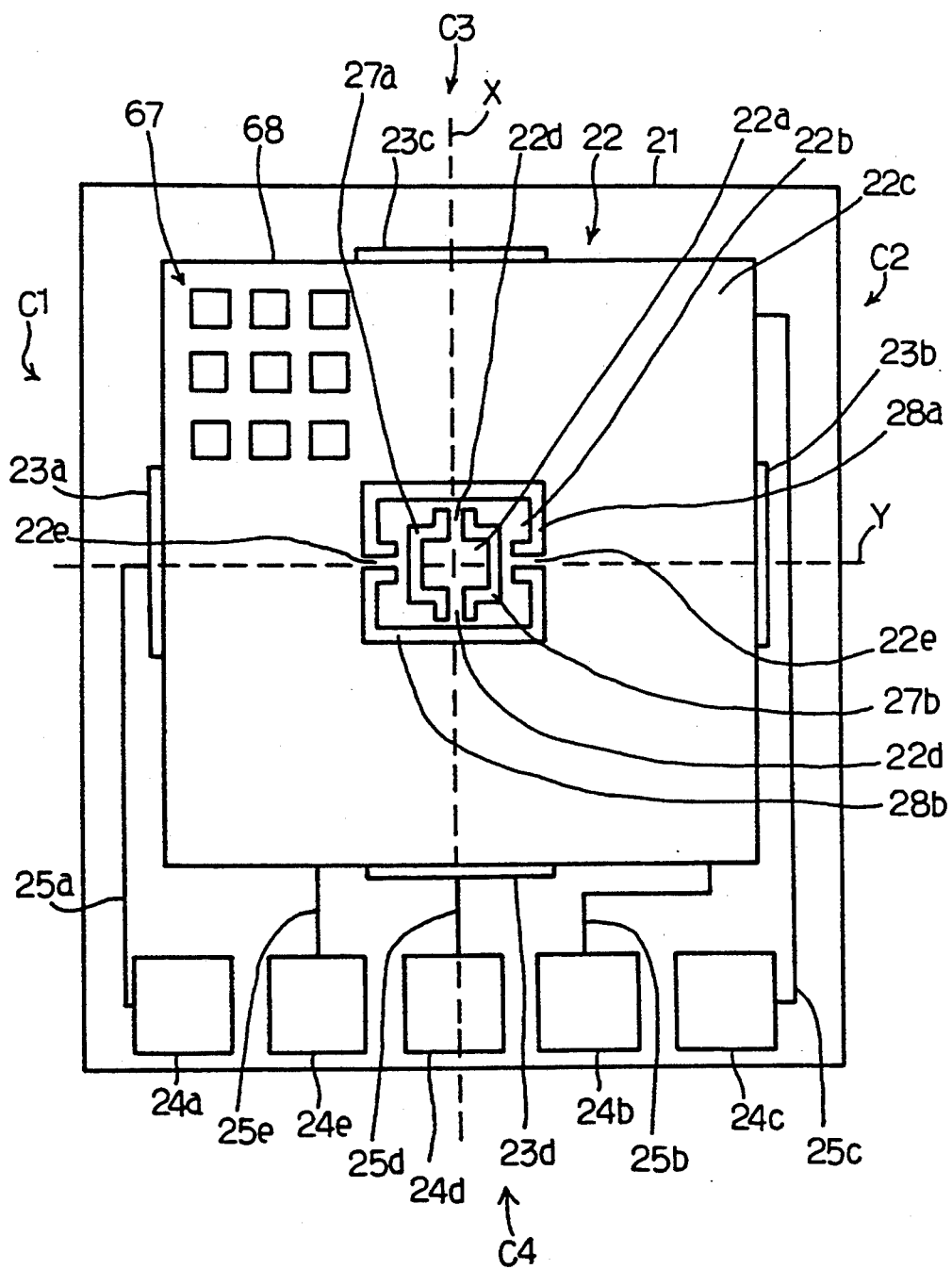
FIG. 20 is a plan view showing the arrangement of a second modification of the still another semiconductor sensor.

FIG. 20 illustrates another modification of the semiconductor sensor implementing the fourth embodiment, and an array of square apertures 67 is formed on an outer weight portion 68. Therefore, the outer weight portion 68 is asymmetric with respect to both axes X and Y, and modifies the sensitivity to both component forces not only in the direction of X-axis but also in the direction of Y-axis.

FIGS. 18 to 20 illustrate the outer weight portions 64, 66 and 68 incorporated in the semiconductor acceleration sensor shown in FIG. 8. However, the outer weight portions 64, 66 and 68 are applicable to the semiconductor sensor shown in FIG. 11.

Although each of the apertures 64a, 65 and 67 is square in section, an aperture in any kind of section is available, and sections may be circle-shaped or formed as a polygon. Moreover, an outer weight may have an additional weight and an aperture or apertures, and an inner weight member may have an aperture or apertures.

The semiconductor sensors according to the present invention are applicable to a mouse serving as an input device of a computer system.

As will be appreciated from the foregoing description, the semiconductor sensors according to the present invention are realized through well-known depositing and patterning technologies, and any partial etching on a reverse surface is unnecessary.

Moreover, the position of each pair of capacitors or each pair of piezo-resistance elements exactly detects a component force of the direction of either X or Y axis without any influence of a component force in the direction of Z-axis, and, for this reason, the semiconductor sensor according to the present invention is improved in resolution of an external force exerted thereto.

Although particular embodiments of the present invention have been shown and described, it will be obvious to those skilled in the art that various changes and modifications may be made without departing from the spirit and scope of the present invention. For example, the semiconductor sensor according to the present invention is available for any physical quantity, such as pressure, convertible into a force exerted on weight portions.

What is claimed is:

1. A semiconductor sensor comprising:
   a) a substrate having a surface;
   b) a conductive supporting member projecting from a central area of said surface of said substrate;
   c) a conductive inner weight member provided over said surface, and bidirectionally rotatable around a first center axis when an external force is exerted thereon;
   d) a pair of first conductive torsion bars coupled between said conductive supporting member and said conductive inner weight member, and having a second center axis substantially aligned with said first center axis;
   e) a conductive outer weight member provided over said surface, and bidirectionally rotatable around a third center axis when said external force is exerted thereon;
   f) a pair of second conductive torsion bars coupled between said conductive inner weight member and said conductive outer weight member, and having a fourth center axis substantially aligned with said third center axis;
   g) a pair of first electrodes forming parts of a first capacitor together with at least said conductive inner weight member, and positioned at first portions of said surface where loops of a bidirectional rotation of said conductive inner weight member and nodes of a bidirectional rotation of said conductive outer weight member take place, said first capacitor having a capacitance variable in dependence on an angular position of said inner weight member around said first center axis, said conductive inner weight member having a maximum amplitude at said loops and a minimum amplitude at said nodes in said bidirectional rotation around said first center axis, said conductive outer weight member having a maximum amplitude at said loops and a minimum amplitude at, said nodes-in said bidirectional rotation around said third center axis; and
   h) a pair of second electrodes forming parts of a second capacitance together with said conductive outer weight member, and positioned at second portions of said surface where loops of said bidirectional rotation of said conductive outer-weight member and nodes of said bidirectional rotational of said conductive inner weight member take place, said second capacitor having a capacitance variable in dependence on an angular position of said conductive outer weight member around said third center axis.

2. A semiconductor sensor as set forth wherein claim 1, in said conductive supporting member, said conductive inner weight member, said pair of first conductive torsion bars, said conductive outer weight member and said pair of second conductive torsion bars are integral with one another.

3. A semiconductor sensor as set forth wherein claim 1, in each of said pair of first conductive torsion bars has wide end portions merged into said conductive supporting member and said conductive inner weight member, and a narrow intermediate portion merged into said wide end portions.

4. A semiconductor sensor as set forth in claim 1, wherein said conductive outer weight member has an aperture means so as to make said conductive outer weight member asymmetric with respect to one of the said first and third center axes.

5. A semiconductor sensor as set forth in claim 1, wherein said conductive outer weight member has an aperture means so as to make said conductive outer weight member asymmetric with respect to both of said first and third center axes.

6. A semiconductor acceleration sensor comprising:
   a) a substrate having a surface;
   b) a conductive supporting member projecting from a central area of said surface of said substrate;
   c) a conductive inner weight member provided over said surface, and bidirectionally rotatable around a first center axis when an external force is exerted thereon;
   d) a pair of first conductive torsion bars coupled between said conductive supporting member and said conductive inner weight member, and having a second center axis substantially aligned with said first center axis;
   e) a conductive outer weight member provided over said surface, and bidirectionally rotatable around a third center axis when said external force is exerted thereon, said third center axis being perpendicular to said first center axis, said conductive outer weight member being asymmetrical with respect to at least one of said first and third center axis;
   f) a pair of second conductive torsion bars coupled between said conductive inner weight member and said conductive outer weight member, and having a fourth center axis substantially aligned with said third center axis;
   g) a pair of first electrodes forming parts of a first capacitor together with said conductive inner weight member, and having respective symmetric lines under said third and fourth center axes, said first capacitor having a capacitance variable in dependence on an angular position of said inner weight member around said first center axis; and
   h) a pair of second electrodes forming parts of a second capacitor together with said conductive outer weight member, and having respective symmetric lines under said first and second center axes, said second capacitor having a capacitance variable in dependence on an angular position of said conductive outer weight member around said third center axis.

7. A semiconductor acceleration sensor comprising:
a) a substrate having a surface;
b) a conductive supporting member projecting from a central area of said surface of said substrate;
c) a conductive inner weight member provided over said surface, and bidirectionally rotatable around a first center axis when an external force is exerted thereon;
d) a pair of first conductive torsion bars coupled between said conductive supporting member and said conductive inner weight member, and having a second center axis substantially aligned with said first center axis, each of the first conductive torsion bars having both end portions and a center portion thinner than said both end portions of said first conductive torsion bars;
e) a conductive outer weight member provided over said surface, and bidirectionally rotatable around a third center axis when said external force is exerted thereon, said third center axis being perpendicular to said first center axis;
f) a pair of second conductive torsion bars coupled between said conductive inner weight member and said conductive outer weight member, and having a fourth center axis substantially aligned with said third center axis, each of the second conductive torsion bars having both end portions and a center portion thinner than said both end portions of said second conductive torsion bars;
g) a pair of first electrodes forming parts of a first capacitor together with said conductive inner weight member, and having respective symmetric lines under said third and fourth center axes, said first capacitor having a capacitance variable in dependence on an angular position of said inner weight member around said first center axis; and
h) a pair of second electrodes forming parts of a second capacitor together with said conductive outer weight member, and having respective symmetric lines under said first and second center axes, said second capacitor having a capacitance variable in dependence on an angular position of said conductive outer weight member around said third center axis.

* * * * *